US008998289B2

(12) United States Patent
Peterson et al.

(10) Patent No.: US 8,998,289 B2
(45) Date of Patent: Apr. 7, 2015

(54) VEHICULAR DOOR ASSEMBLIES AND VEHICLES HAVING SAME

(71) Applicant: Honda Motor Co., Ltd., Minato-ku, Tokyo (JP)

(72) Inventors: Michael Vincent Peterson, Marysville, OH (US); John B. Jones, Toledo, OH (US)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 13/760,116

(22) Filed: Feb. 6, 2013

(65) Prior Publication Data

US 2014/0217774 A1 Aug. 7, 2014

(51) Int. Cl.

| | |
|---|---|
| ***B60J 5/04*** | (2006.01) |
| ***E05D 3/00*** | (2006.01) |
| ***E05D 3/02*** | (2006.01) |
| ***E05D 5/14*** | (2006.01) |
| ***E05D 9/00*** | (2006.01) |

(52) U.S. Cl.

CPC .. *E05D 3/00* (2013.01); *E05D 3/02* (2013.01); *E05D 5/14* (2013.01); *E05D 9/00* (2013.01); *E05Y 2600/46* (2013.01); *E05Y 2800/33* (2013.01); *E05Y 2800/45* (2013.01); *E05Y 2900/531* (2013.01)

(58) Field of Classification Search

CPC ... E05Y 2900/531; B60J 5/0487; E05D 5/062
USPC ................. 296/146.1, 146.11, 146.5, 190.11; 16/381, 261, 262, 263
See application file for complete search history.

(56) References Cited

U.S. PATENT DOCUMENTS

| | | | | |
|---|---|---|---|---|
| 4,378,658 | A | 4/1983 | DeLorean | |
| 5,842,735 | A * | 12/1998 | Makino et al. | 296/187.12 |
| 6,052,870 | A * | 4/2000 | Hagenlocher et al. | 16/347 |
| 6,336,675 | B1 | 1/2002 | Bruckner | |
| 7,281,753 | B2 | 10/2007 | Curtis, Jr. et al. | |
| 7,530,623 | B2 | 5/2009 | Hampel | |
| 7,594,690 | B2 * | 9/2009 | Hedderly | 296/146.11 |
| 7,597,385 | B2 * | 10/2009 | Shibata et al. | 296/190.11 |
| 7,926,862 | B2 | 4/2011 | Smith et al. | |
| 8,096,052 | B2 * | 1/2012 | Hampel | 29/897.2 |
| 8,156,611 | B2 * | 4/2012 | Machin et al. | 16/261 |
| 2008/0106115 | A1 * | 5/2008 | Hughes | 296/102 |
| 2011/0156438 | A1 | 6/2011 | Ichihara et al. | |
| 2012/0161468 | A1 | 6/2012 | Tsumiyama et al. | |

* cited by examiner

*Primary Examiner* — Jason S Morrow
*Assistant Examiner* — E Turner Hicks
(74) *Attorney, Agent, or Firm* — Ulmer & Berne LLP

(57) ABSTRACT

A vehicular door assembly includes a door and at least one hinge structure. Each of the at least one hinge structure includes a knuckle and a bushing. The knuckle extends away from the door. The door and the knuckle of each of the at least one hinge structure are integrally formed as a unitary structure. The knuckle of each of the at least one hinge structure includes an upper surface and a lower surface, and defines a bore extending through the knuckle and opening onto each of the upper surface and the lower surface. The bushing defines a hinge aperture and a hinge axis. At least a substantial portion of the bushing is positioned within the bore defined by a respective one of the knuckles. Each of the at least one hinge structure is configured for coupling with a frame of a vehicle. Vehicles are also provided.

15 Claims, 8 Drawing Sheets

VEHICULAR DOOR ASSEMBLIES AND VEHICLES HAVING SAME

TECHNICAL FIELD

Disclosed herein are door assemblies and vehicles having door assemblies.

BACKGROUND

Some conventional utility vehicles include a door which assists in protecting properly seated and secured operators during a rollover situation or a situation involving a significant lateral incline of the vehicle.

SUMMARY

In accordance with one embodiment, a vehicle includes a frame, a door, and at least one hinge structure. The at least one hinge structure pivotally couples the door with the frame. Each of the at least one hinge structure comprises a knuckle extending away from the door. The door and the knuckle of each of the at least one hinge structure are integrally formed as a unitary structure. The knuckle of each of the at least one hinge structure comprises an upper surface and a lower surface, and defines a bore extending through the knuckle and opening onto each of the upper surface and the lower surface. Each of the at least one hinge structure further comprises a bushing, a bracket, and a male hinge member. The bushing defines a hinge aperture and a hinge axis. At least a substantial portion of the bushing is positioned within the bore defined by a respective one of the knuckles. For each of the at least one hinge structure, the bracket is attached to the frame, and the male hinge member extends through the hinge aperture defined by the bushing and pivotally couples the knuckle with the bracket, such that the door is pivotable between a closed position and an open position about the hinge axis.

In accordance with another embodiment, a utility vehicle comprises a frame, at least one front seat supported by the frame, a utility bed, a door, and at least one hinge structure. The utility bed is supported by the frame and is convertible into at least one rear seat. The at least one hinge structure pivotally couples the door with the frame. Each of the at least one hinge structure comprises a knuckle extending away from the door. The door and the knuckle of each of the at least one hinge structure are integrally formed as a unitary structure. The knuckle of each of the at least one hinge structure comprises an upper surface and a lower surface, and defines a bore extending through the knuckle and opening onto each of the upper surface and the lower surface. Each of the at least one hinge structure further comprises a bushing, a bracket, and a male hinge member. The bushing defines a hinge aperture and a hinge axis. At least a substantial portion of the bushing is positioned within the bore defined by a respective one of the knuckles. For each of the at least one hinge structure, the bracket is attached to the frame, and the male hinge member extends through the hinge aperture defined by the bushing and pivotally couples the knuckle with the bracket, such that the door is pivotable between a closed position and an open position about the hinge axis.

In accordance with yet another embodiment, a door assembly is provided for a vehicle. The door assembly comprises a door and at least one hinge structure. Each of the at least one hinge structure comprises a knuckle extending away from the door. The door and the knuckle of each of the at least one hinge structure is integrally formed as a unitary structure. The knuckle of each of the at least one hinge structure comprises an upper surface and a lower surface, and defines a bore extending through the knuckle and opening onto each of the upper surface and the lower surface. Each of the at least one hinge structure further comprises a bushing. The bushing defines a hinge aperture and a hinge axis extending longitudinally through the hinge aperture. At least a substantial portion of the bushing is positioned within the bore defined by a respective one of the knuckles. Each of the at least one hinge structure is configured for coupling with a frame of a vehicle.

BRIEF DESCRIPTION OF THE DRAWINGS

Various embodiments will become better understood with regard to the following description, appended claims and accompanying drawings wherein:

DETAILED DESCRIPTION

Figure 1:
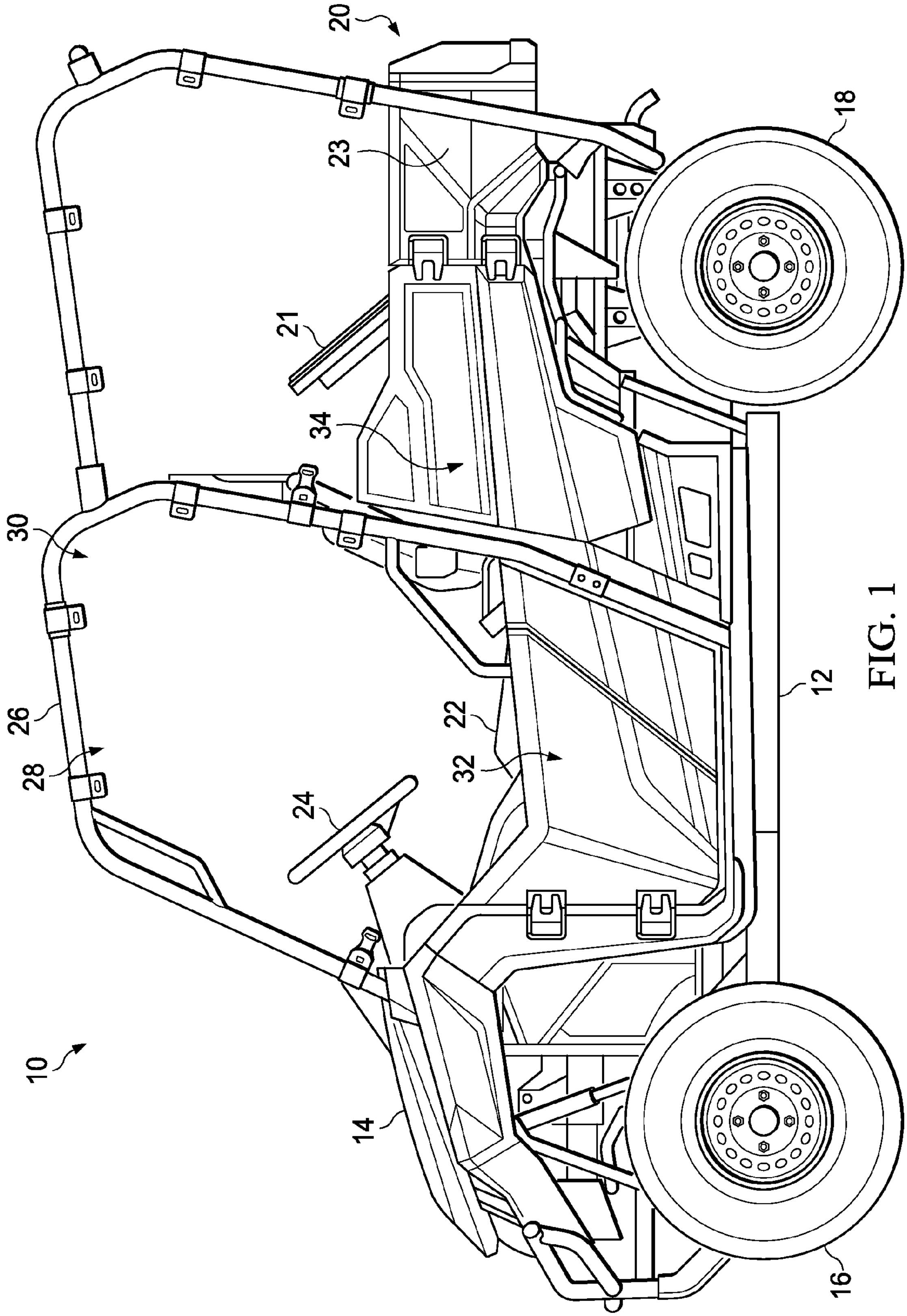
FIG. 1 is left side elevational view generally depicting a multi-use vehicle ("MUV") having front and rear door assemblies, in accordance with one embodiment.

Certain embodiments are hereinafter described in detail in connection with the views and examples of FIGS. 1-8. FIG. 1 illustrates a vehicle 10 that can include a frame, indicated generally at 12, and a body 14 supported by frame 12. Vehicle 10 can further include a pair of front wheels 16 and a pair of rear wheels 18. The wheels 16 and 18 can be suspended from frame 12 and can be rotatable relative to frame 12. Vehicle 10 can also include a source of motive power (not shown), which can be an internal combustion engine and/or one or more electric motors, and a drivetrain (not shown) for transferring torque from the source of motive power to the rear wheels 18 and/or the front wheels 16.

Vehicle 10 is shown to be an MUV that can include a utility bed 20 that can be supported by the frame 12, and either be fixed with respect to the body 14, or selectively pivotable as a dump-type bed. The utility bed 20 can be configured to support cargo and/or passengers for transportation by the vehicle 10. For example, in one embodiment, the utility bed 20 can be convertible between a cargo-hauling configuration and a seating configuration. When in the seating configuration, the utility bed 20 can define at least one rear seat 21 for supporting one or more occupants of the vehicle 10. In other embodiments, a vehicle might not include a utility bed.

Vehicle 10 can further include a front seat 22 that can be supported by the frame 12 and/or body 14, and that can be configured to support an operator (not shown). The front seat 22 can be a bucket-type seat or a bench-type seat. Vehicle 10 can also include a steering wheel 24 that can be coupled to the front wheels 16. By turning the steering wheel 24, it will be appreciated that an operator can effect steering of the vehicle 10.

Vehicle 10 can include a roll cage 26 which can be attached to, and supported by, the frame 12 and/or body 14 of vehicle 10. The roll cage 26 can at least partially define a protected area, indicated generally at 28. The front seat 22 can supported by the frame 12 and positioned within the protected area 28, such that an operator of vehicle 10 can be located within the protected area 28 when seated upon front seat 22 during operation of vehicle 10. In one embodiment, rear seats (e.g., 21) provided by the utility bed 20 can also be located in the protected area 28.

The vehicle 10 can include one or more door assemblies such as, for example, a front left door assembly 32 and a rear left door assembly 34. The front left door assembly 32 can be adjacent to the front seat 22, and the rear left door assembly 34 can be adjacent to the rear seat 21. Similar door assemblies can also be provided on the right side of the vehicle 10. It will be appreciated that a vehicle can also include a rear cargo door assembly, or other type of door assembly. It will also be appreciated that a vehicle might not include rear door assemblies. In the configuration of FIG. 1, the rear door assemblies (e.g., 34) can be coupled with or part of the utility bed 20, and configured to pivot with the utility bed 20 between a lowered, hauling or seating position, and a raised or dumping position. In such a configuration, the rear door assemblies (e.g., 34) can be pivotally coupled with a side wall 23 of the utility bed 20, and can thus be attached or coupled with the frame 12 indirectly through the utility bed 20. In other embodiments, in which rear seats are not provided as part of a dump-type bed, or in which rear door assemblies are not provided as part of a utility bed, the rear door assemblies can be directly attached or coupled with a frame of a vehicle.

The roll cage 26 can cooperate with the frame 12, the body 14, and/or one or more door assemblies (e.g., 32, 34) of the vehicle 10 to at least partially define one or more access openings that communicate with the protected area 28. For example, an access opening 30 is shown to be provided on the left side of vehicle 10, and a similar access opening can be provided on the right side of the vehicle 10. An operator of vehicle 10 can pass through the access opening 30 into the protected area 28 when boarding the vehicle 10, and can pass from the protected area 28 through the access opening 30 when exiting the vehicle 10. It will be appreciated that an access opening can additionally, or alternatively, be at least partially defined by one or more other features of a vehicle.

The protected area 28 can be sized and configured to substantially or entirely surround one or more occupants (e.g., an operator or driver, and a passenger, each not shown) of the vehicle 10 during operation of the vehicle 10. It will be appreciated that, in one embodiment, one or more nets can be attached to a roll cage, seatbelt harnesses can be associated with one or more front seats (e.g., 22) and rear seats (e.g., 21), and one or more restraint members, e.g., a hip bolster, can be provided to assist the roll cage for selectively restraining one or more operators within a vehicle.

Figure 2:
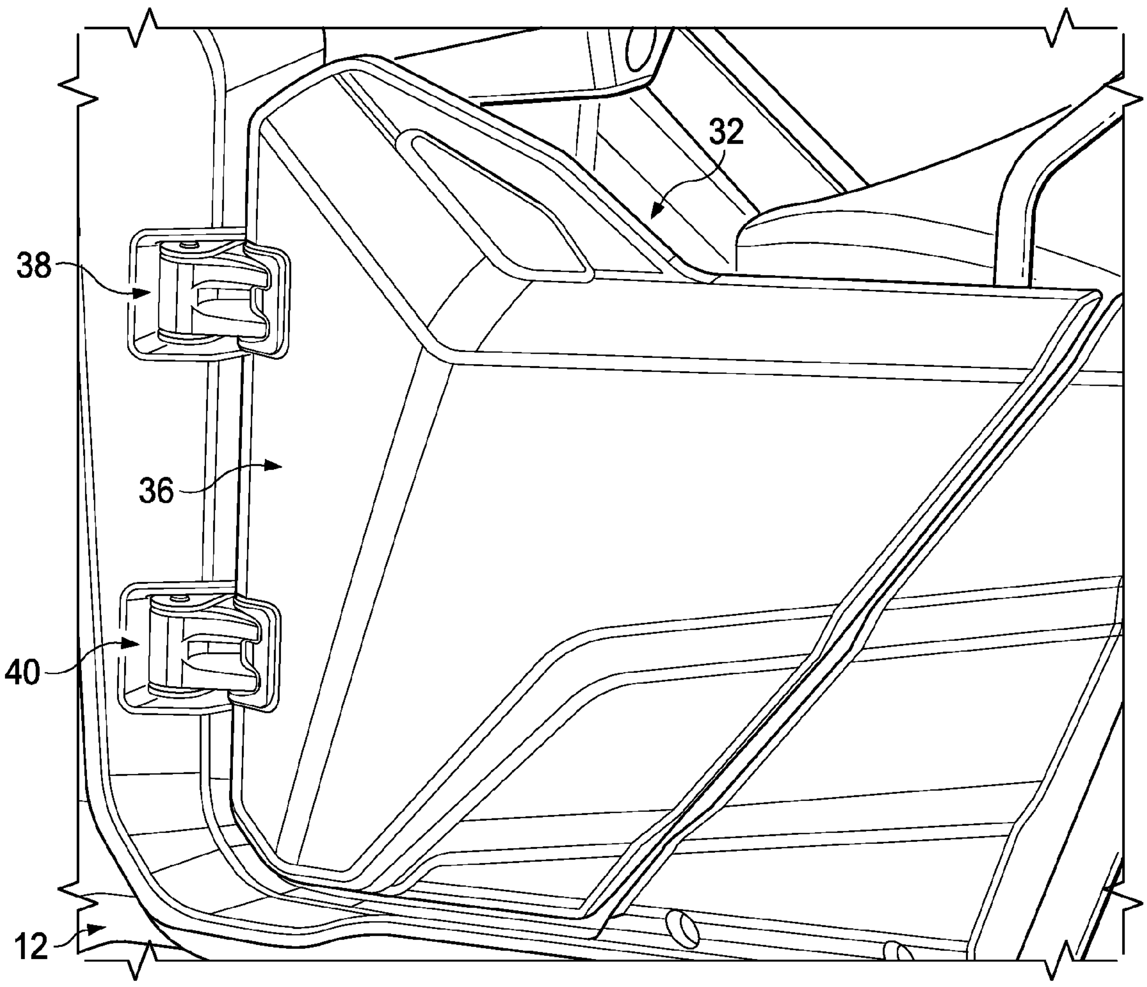
FIG. 2 is an enlarged left side perspective view depicting a portion of the vehicle of FIG. 1, including a left front door assembly.
Figure 5:
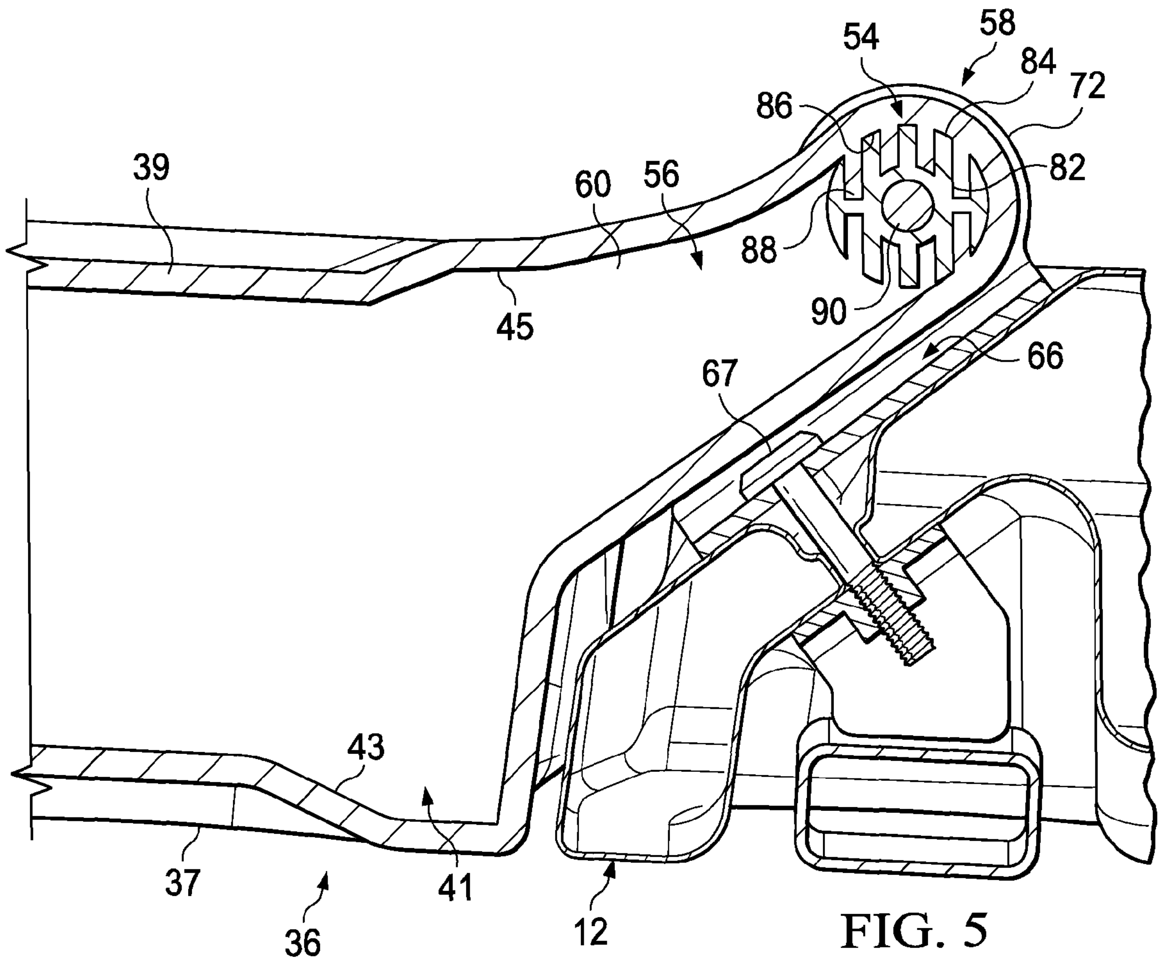
FIG. 5 is a cross-sectional view taken along lines 5-5 in FIG. 4.
Figure 6:
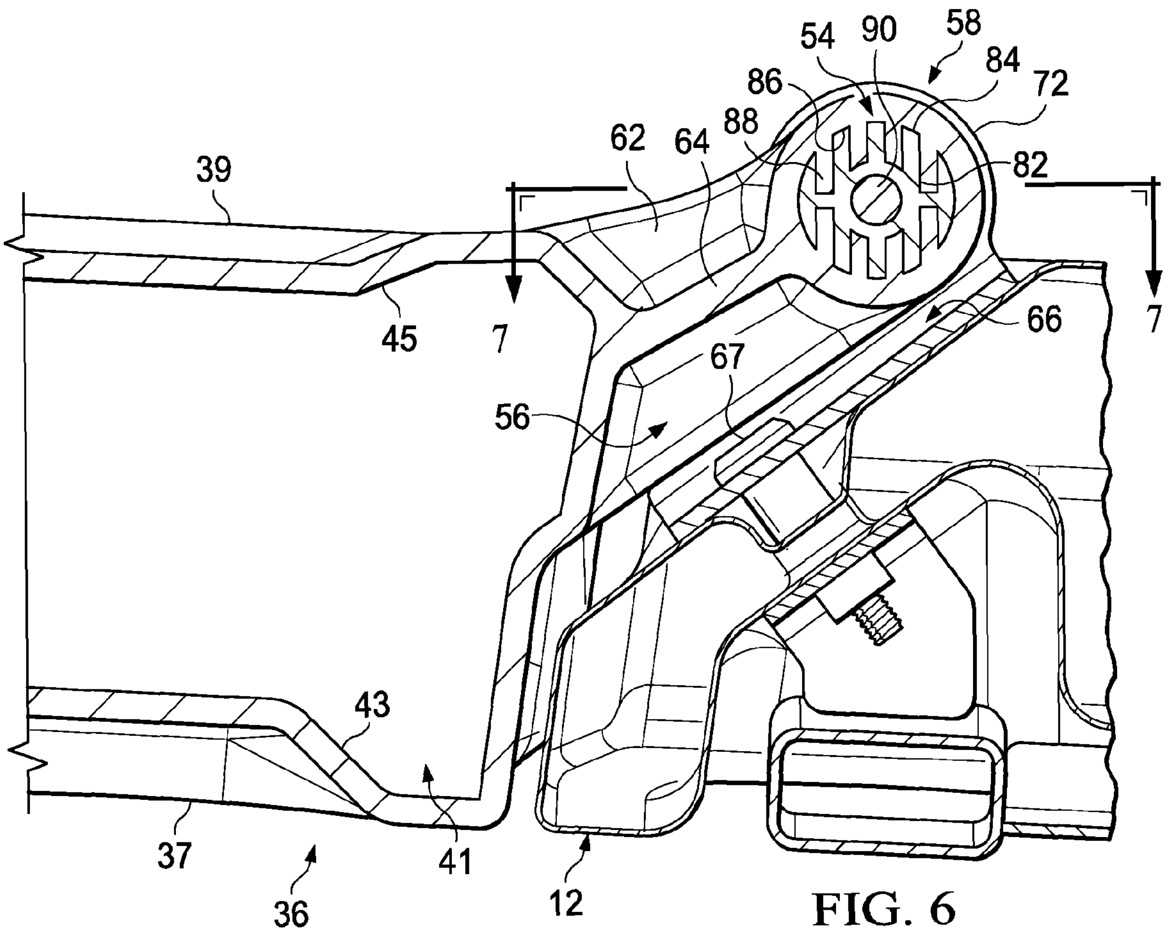
FIG. 6 is a cross-sectional view taken along lines 6-6 in FIG. 4.

As illustrated in FIG. 2, the front left door assembly 32 can include a door 36, an upper hinge structure 38, and a lower hinge structure 40. The upper hinge structure 38 is shown to be spaced from the lower hinge structure 40. The upper and lower hinge structures 38, 40 can pivotally couple a forward end of the door 36 to the frame 12, directly or through other structures such as the body 14, such that the door 36 can swing forward and rearward between open and closed positions, respectively. In one embodiment, the door 36 can comprise one or more door panels, such as interior and exterior door panels that are attached together or provided as a unitary structure. For example, in one embodiment, the door 36 can be formed in a blow-molding process, such that an interior panel 37 and an exterior panel 39 of the door 36 can be integrally formed from a polymeric material as a unitary structure and can include respective interior surfaces 43 and 45 that can cooperate to define a cavity 41, as shown in FIGS. 5-6.

The upper hinge structure 38 is shown in FIGS. 4-7 to include a knuckle 48 that is pivotally coupled with a bracket 66. The bracket 66 can be formed, such as by stamping or casting, from steel, another metal, or another material. The bracket 66 can be attached to the frame 12, such as with one or more bolts 67 (FIGS. 5-6), and can include upper and lower bracket flanges 68 and 72 that define respective upper and lower bracket apertures 70 and 74.

The knuckle 48 can be formed integrally with the door 36 as a unitary structure, from a polymeric material, and can extend away from the door 36. The knuckle 48 is shown to include a beam portion 56 and a barrel portion 58 integral with the beam portion 56 and positioned outwardly from the door 36. The barrel portion 58 can define a bore 54 and can include an upper surface 50 and a lower surface 52. The bore 54 can extend through the knuckle 48 and open onto each of the upper surface 50 and the lower surface 52. The beam portion 56 can include an upper flange 60, a lower flange 62, and a web 64 extending between the upper flange 60 and the lower flange 62. The web 64 can be offset inwardly from the upper flange 60 and the lower flange 62, to create a pinched-off region of the buckle 48, as shown in FIG. 6. This configuration of the beam portion 56 can provide strength and rigidity, to help prevent bending or movement of the barrel portion 58 relative to the door 36 over time.

Figure 7:
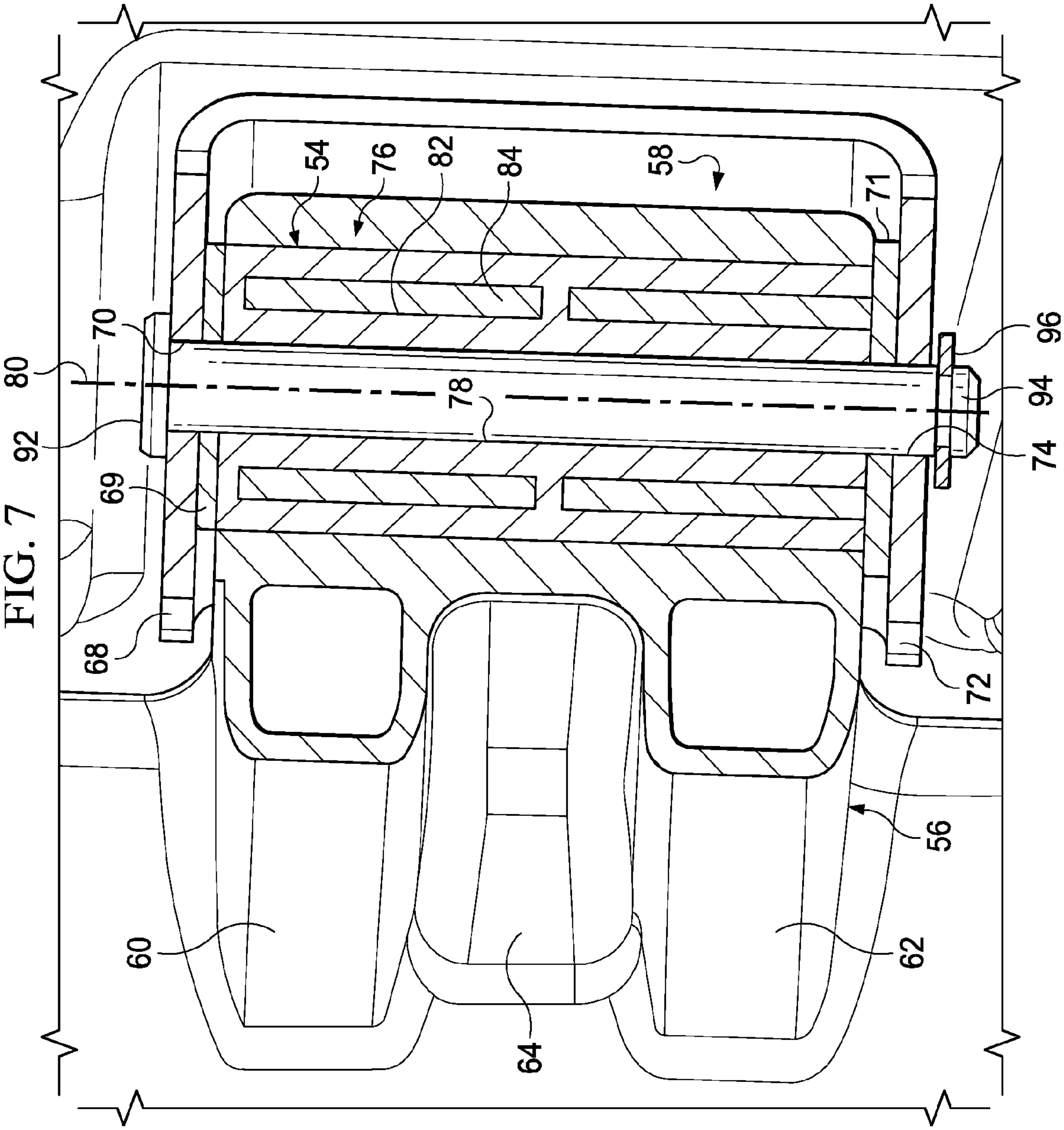
FIG. 7 is a cross-sectional view taken along lines 7-7 in FIG. 6.
Figure 8:
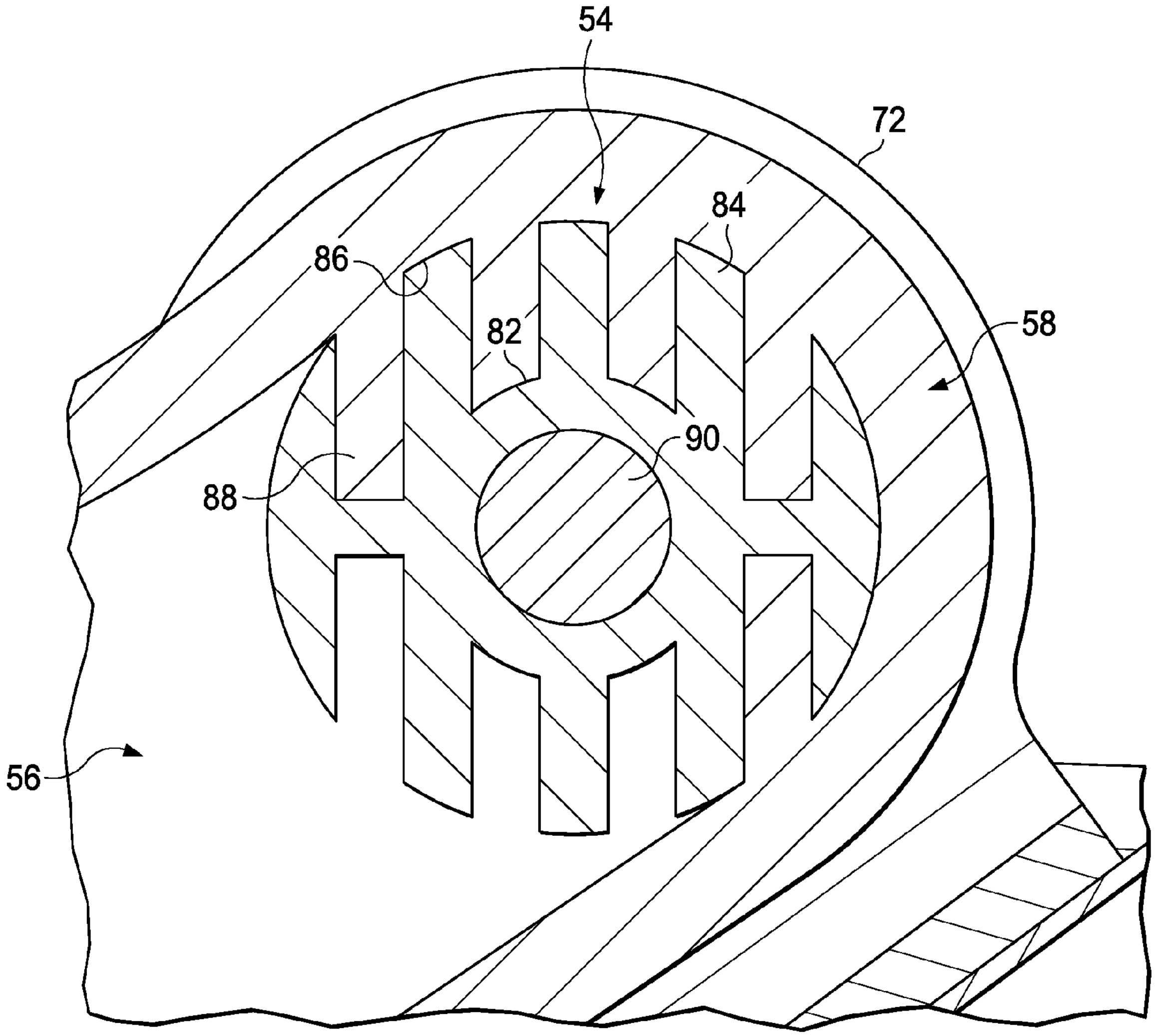
FIG. 8 is an enlargement of a portion of FIG. 5.

The upper hinge structure 38 can additionally include a bushing 76. The bushing 76 can define a hinge aperture 78 and a hinge axis 80 extending longitudinally through the hinge aperture 78, as shown in FIG. 7. At least a substantial portion of the bushing 76 can be positioned within the bore 54 defined by the knuckle 48. For example, in one embodiment, after the knuckle is manufactured, the bushing can be inserted into the bore of the knuckle. In another embodiment, the bushing can be insert-molded or otherwise inserted into the bore of the knuckle during the process of manufacturing the knuckle. The knuckle can be formed from plastic, metal, or any of a variety of other suitable materials.

In one embodiment, the bushing 76 can include an outer surface 82 and a plurality of circumferentially spaced fins 84 that extend outwardly from the outer surface 82. The fins 84 can extend longitudinally parallel with the hinge axis 80, as generally shown in FIGS. 5-8. The barrel portion 58 of the knuckle 48 can include an inner surface 86 and a plurality of circumferentially spaced ribs 88. Each of the ribs 88 can extend inwardly from the inner surface 86 and longitudinally parallel with the hinge axis 80, as generally shown in FIGS. 5-8. The fins 84 of the bushing 76 are shown to be, embedded, interdigitated or otherwise meshed with the ribs 88 of the barrel portion 58 of the knuckle 48, and can, in this configuration, facilitate effective support of the bushing 76 by the barrel portion 58.

To assemble the upper hinge structure 38, the barrel portion 58 of the knuckle 48 can be positioned between the upper bracket flange 68 and the lower bracket flange 72. A male hinge member, such as a pin 90, can extend sequentially through the upper bracket aperture 70 in the upper bracket flange 68, a bushing 69, the hinge aperture 78 in the bushing 76, a bushing 71, and the lower bracket aperture 74 in the lower bracket flange 72, until a head 92 of the pin 90 is positioned adjacent to or contacts the upper bracket flange 68, as shown in FIG. 7. In this configuration, a lower end portion 94 of the pin 90 can extend below the lower bracket flange 72, and a retaining clip 96 can be secured to the lower end portion 94 of the pin 90. The pin 90 can thus pivotally couple the knuckle 48 with the bracket 66, such that the door 36 is pivotable between a closed position and an open position about the hinge axis 80. The bushings 69, 71 and 76 can help to keep tolerance and prevent wear over time, as might otherwise occur more rapidly were they not present. The bushings 69 and 71 can be washers, flanges defined by the knuckle 48 or bushing 76, other structures, or can alternatively not be provided.

By providing the knuckle 48 as a unitary structure with the door 36, as opposed to providing a separate metal hinge element that is bolted or welded to the door and is coupled with a pin to the bracket 66, it will be appreciated that weight can be reduced, assembly time improved, and cost saved.

Figure 3:
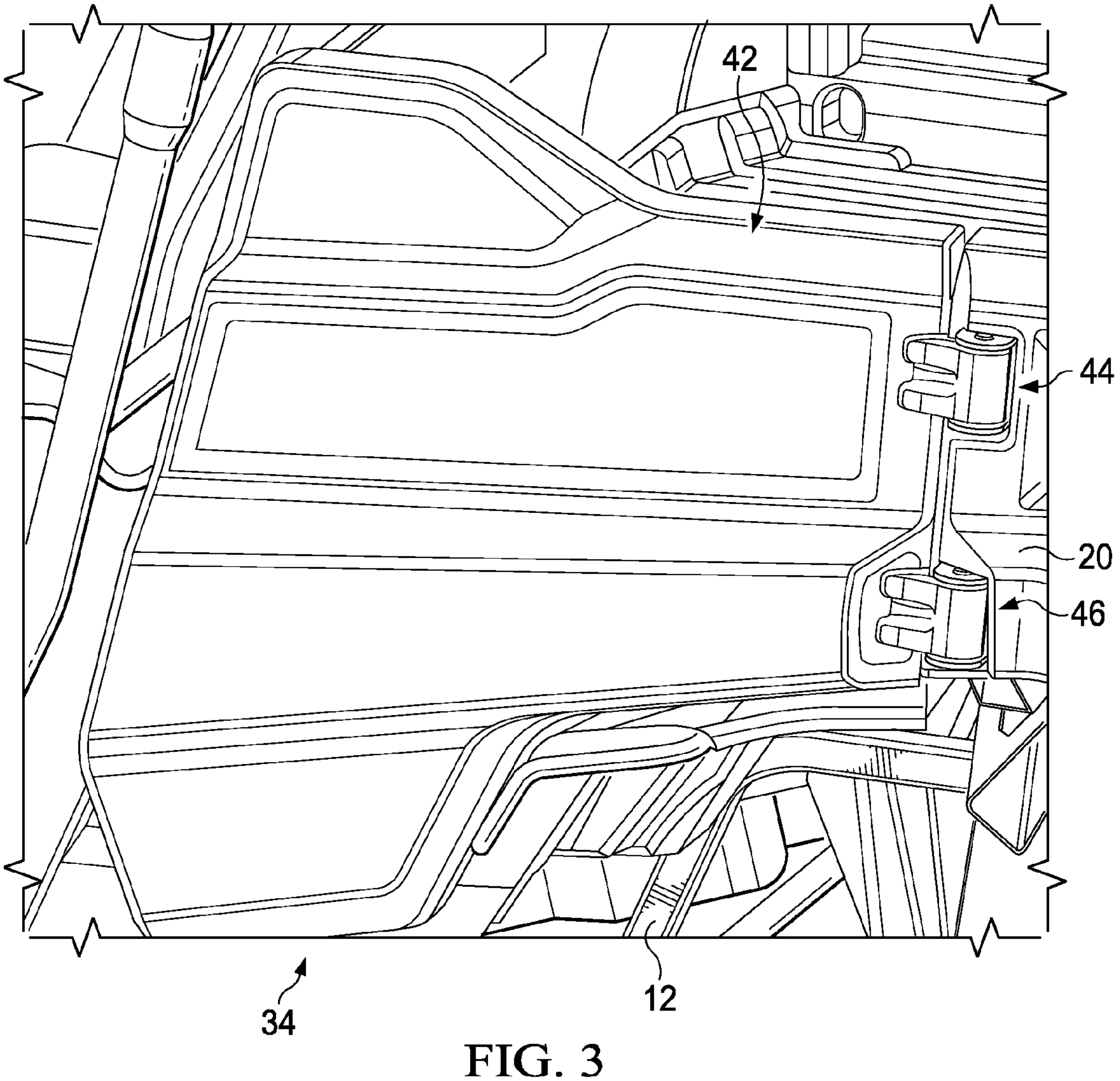
FIG. 3 is an enlarged left side perspective view depicting a another portion of the vehicle of FIG. 1, including a left rear door assembly.
Figure 4:
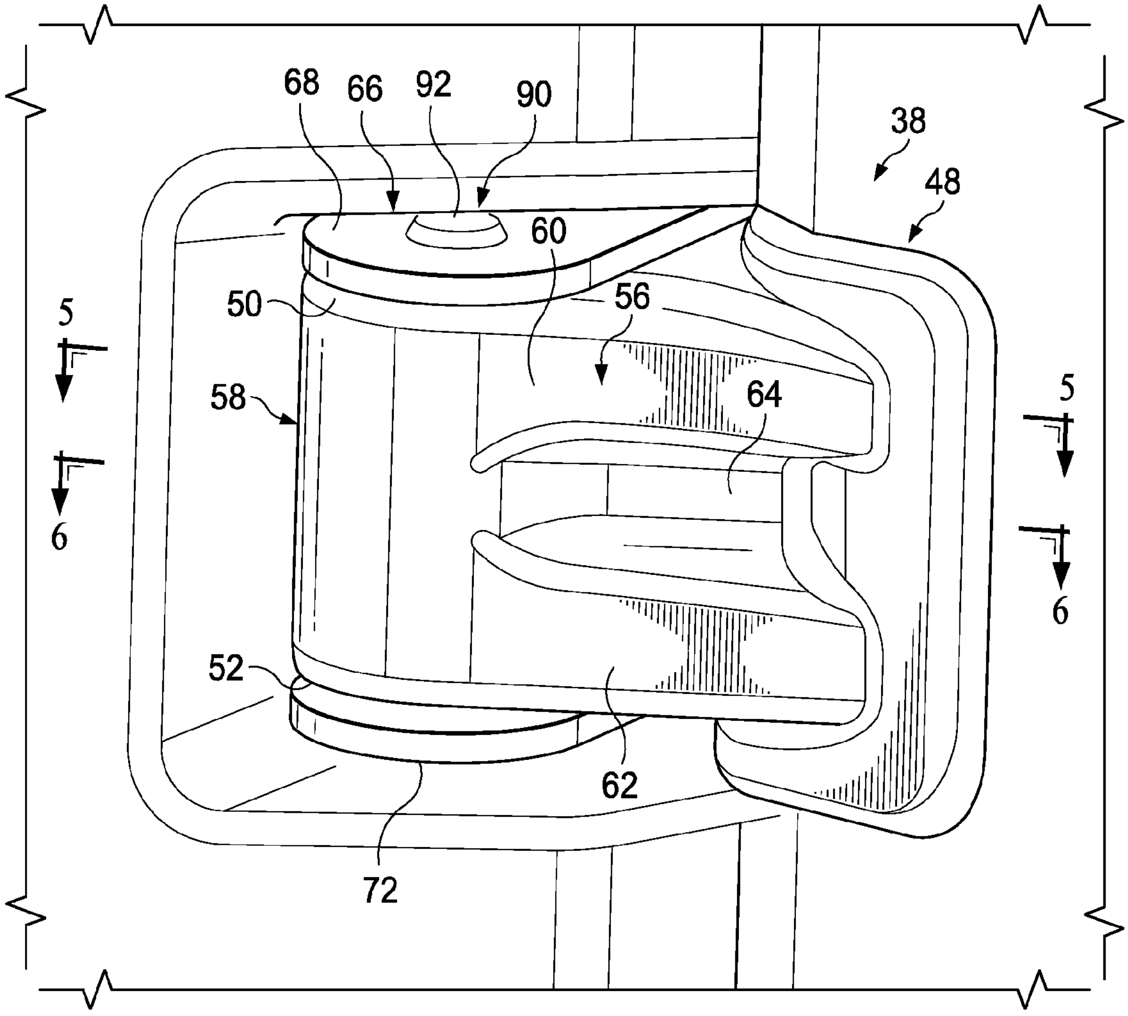
FIG. 4 is an enlarged left side perspective view depicting a portion of the vehicle of FIG. 2, including a portion of a hinge structure of the left front door assembly.

The lower hinge structure 40 can be similar in configuration and operation as the upper hinge structure 38 described above. Other door assemblies on the vehicle 10 can also be similar in configuration and operation as the front left door assembly 32 described above. For example, as shown in FIG. 3, the rear left door assembly 34 can include a door 42, an upper hinge structure 44, and a lower hinge structure 46, with the upper and lower hinge structures 44, 46 similar in configuration and operation as the upper hinge structure 38 described above. The door 42 can swing rearward and forward between open and closed positions, respectively.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:

a frame a door; and at least one hinge structure, the at least one hinge structure pivotally coupling the door with the frame, each of the at least one hinge structure comprising a knuckle extending away from the door, the door and the knuckle of each of the at least one hinge structure being integrally formed as a unitary structure; wherein:

the knuckle of each of the at least one hinge structure comprises an upper surface and a lower surface, and defines a bore extending through the knuckle and opening onto each of the upper surface and the lower surface;

each of the at least one hinge structure further comprises a bushing, a bracket, and a male hinge member, the bushing defining a hinge aperture and a hinge axis, at least a substantial portion of the bushing being positioned within the bore defined by a respective one of the knuckles;

the door and the knuckle of each of the at least one hinge structure are integrally formed from a polymeric material as a unitary structure; and for each of the at least one hinge structure:

the bracket is attached to the frame, and the male hinge member extends through the hinge aperture defined by the bushing and pivotally couples the knuckle with the bracket, such that the door is pivotable between a closed position and an open position about the hinge axis;

the knuckle further comprises a beam portion and a barrel portion integral with the beam portion and positioned outwardly from the door, the barrel portion defining the bore;

the beam portion comprises an upper flange, a lower flange, and a web extending between the upper flange and the lower flange, the web being offset inwardly from the upper flange and the lower flange;

the bushing comprises an outer surface and a plurality of circumferentially spaced fins, each of the fins extending outwardly from the outer surface and longitudinally parallel with the hinge axis; and the barrel portion of the knuckle comprises an inner surface and a plurality of circumferentially spaced ribs, each of the ribs extending inwardly from the inner surface and longitudinally parallel with the hinge axis, the fins of the bushing being meshed with the ribs of the barrel portion of the knuckle.

2. The vehicle of claim 1, wherein:

the at least one hinge structure comprises an upper hinge structure and a lower hinge structure spaced from the upper hinge structure; and the door comprises a front door.

3. The vehicle of claim 1, wherein:

the at least one hinge structure comprises an upper hinge structure and a lower hinge structure spaced from the upper hinge structure; and the door comprises a rear door.

4. A utility vehicle comprising:

a frame;

at least one front seat supported by the frame;

a utility bed supported by the frame, the utility bed being convertible into at least one rear seat a door; and at least one hinge structure, the at least one hinge structure pivotally coupling the door with the frame, each of the at least one hinge structure comprising a knuckle extending away from the door, the door and the knuckle of each of the at least one hinge structure being integrally formed as a unitary structure; wherein:

the knuckle of each of the at least one hinge structure comprises an upper surface and a lower surface, and defines a bore extending through the knuckle and opening onto each of the upper surface and the lower surface;

each of the at least one hinge structure further com rises a bushing, a bracket, and a male hinge member, the bushing defining a hinge aperture and a hinge axis, at least a substantial portion of the bushing being positioned within the bore defined by a respective one of the knuckles;

the door and the knuckle of each of the at least one hinge structure are integrally formed from a polymeric material as a unitary structure; and for each of the at least one hinge structure:

the bracket is attached to the frame, and the male hinge member extends through the hinge aperture defined by the bushing and pivotally couples the knuckle with the bracket, such that the door is pivotable between a closed position and an open position about the hinge axis;

the knuckle further comprises a beam portion and a barrel portion integral with the beam portion and positioned outwardly from the door, the barrel portion defining the bore;

the beam portion comprises an upper flange, a lower flange, and a web extending between the upper flange and the lower flange, the web being offset inwardly from the upper flange and the lower flange;

the bushing comprises an outer surface and a plurality of circumferentially spaced fins, each of the fins extending outwardly from the outer surface and longitudinally parallel with the hinge axis; and the barrel portion of the knuckle comprises an inner surface and a plurality of circumferentially spaced ribs, each of the ribs extending inwardly from the inner surface and longitudinally parallel with the hinge axis, the fins of the bushing being meshed with the ribs of the barrel portion of the knuckle.

5. The utility vehicle of claim 4 wherein, for each of the at least one hinge structure:

the bracket comprises an upper bracket flange defining an upper bracket aperture, and a lower bracket flange defining a lower bracket aperture;

the barrel portion of the knuckle is positioned between the upper bracket flange and the lower bracket flange; and the male hinge member extends through each of the upper bracket aperture, the hinge aperture, and the lower bracket aperture.

6. The utility vehicle of claim 5, wherein each of the at least one hinge structure further comprises a retaining clip, and wherein, for each of the at least one hinge structure:

the male hinge member comprises a pin, the pin comprising a head and a lower end portion, the head being positioned adjacent the upper bracket flange, the lower end portion extending below the lower bracket flange; and the retaining clip is secured to the lower end portion of the pin.

7. The utility vehicle of claim 4 further comprising a roll cage attached to the frame.

8. The utility vehicle of claim 7, wherein:

the at least one hinge structure comprises an upper hinge structure and a lower hinge structure spaced from the upper hinge structure.

9. The utility vehicle of claim 8, wherein:

the door comprises a front door and is adjacent one of the at least one front seat.

10. The utility vehicle of claim 8, wherein:

the door comprises a rear door and is adjacent one of the at least one rear seat.

11. A door assembly for a vehicle, the door assembly a door; and at least one hinge structure, each of the at least one hinge structure comprising a knuckle extending away from the door, the door and the knuckle of each of the at least one hinge structure being integrally formed as a unitary structure; wherein:

the knuckle of each of the at least one hinge structure comprises an upper surface and a lower surface, and defines a bore extending through the knuckle and opening onto each of the upper surface and the lower surface;

each of the at least one hinge structure further comprises a bushing, the bushing defining a hinge aperture and a hinge axis extending longitudinally through the hinge aperture, at least a substantial portion of the bushing being positioned within the bore defined by a respective one of the knuckles;

each of the at least one hinge structure is configured for coupling with a frame of a vehicle;

the door and the knuckle of each of the at least one hinge structure are integrally formed from a polymeric material as a unitary structure;

for each of the at least one hinge structure:

the knuckle further comprises a beam portion and a barrel portion integral with the beam portion and positioned outwardly from the door, the barrel portion defining the bore; and the beam portion comprises an upper flange, a lower flange, and a web extending between the upper flange and the lower flange, the web being offset inwardly from the upper flange and the lower flange;

the bushing comprises an outer surface and a plurality of circumferentially spaced fins, each of the fins extending outwardly from the outer surface and longitudinally parallel with the hinge axis; and the barrel portion of the knuckle comprises an inner surface and a plurality of circumferentially spaced ribs, each of the ribs extending inwardly from the inner surface and longitudinally parallel with the hinge axis, the fins of the bushing being meshed with the ribs of the barrel portion of the knuckle.

12. A door assembly for a vehicle, the door assembly comprising:

a door; and at least one hinge structure, each of the at least one hinge structure comprising a knuckle extending away from the door, the door and the knuckle of each of the at least one hinge structure being integrally formed as a unitary structure; wherein:

each of the at least one hinge structure further comprises a bushing, the bushing defining a hinge aperture and a hinge axis extending longitudinally through the hinge aperture, at least a substantial portion of the bushing being positioned within the bore defined by a respective one of the knuckles;

for each of the at least one hinge structure:

the bushing comprises an outer surface and a plurality of circumferentially spaced fins, each of the fins extending outwardly from the outer surface and longitudinally parallel with the hinge axis; and the barrel portion of the knuckle comprises an inner surface and a plurality of circumferentially spaced ribs, each of the ribs extending inwardly from the inner surface and longitudinally parallel with the hinge axis, the fins of the bushing being meshed with the ribs of the barrel portion of the knuckle.

13. The door assembly of claim 12 wherein the knuckle of each of the at least one hinge structures are integrally formed from a polymeric material as a unitary structure.

14. The door assembly of claim 13 wherein, for each of the at least one hinge structure:

the knuckle further comprises a beam portion and a barrel portion integral with the beam portion and positioned outwardly from the door, the barrel portion defining the bore; and the beam portion comprises an upper flange, a lower flange, and a web extending between the upper flange and the lower flange, the web being offset inwardly from the upper flange and the lower flange.

15. The door assembly of claim 14, wherein:

the at least one hinge structure comprises an upper hinge structure and a lower hinge structure spaced from the upper hinge structure.

* * * * *

UNITED STATES PATENT AND TRADEMARK OFFICE

CERTIFICATE OF CORRECTION

PATENT NO. : 8,998,289 B2
APPLICATION NO. : 13/760116
DATED : April 7, 2015
INVENTOR(S) : Michael Vincent Peterson et al.

It is certified that error appears in the above-identified patent and that said Letters Patent is hereby corrected as shown below:

In the Claims

Claim 1, column 5, line 46, change “a frame” to --a frame;--;
Claim 4, column 6, line 40, change “rear seat” to --rear seat;--; and
Claim 4, column 6, line 52, change “com rises” to --comprises--.

Signed and Sealed this
Eighth Day of September, 2015

Michelle K. Lee
*Director of the United States Patent and Trademark Office*